Dec. 22, 1953   B. T. HENSGEN   2,663,081
CHEESE CURD CUTTER
Filed June 6, 1951

INVENTOR.
Bernard T. Hensgen
BY
R. G. Story
ATTORNEY

Patented Dec. 22, 1953

2,663,081

UNITED STATES PATENT OFFICE 2,663,081

CHEESE CURD CUTTER

Bernard T. Hensgen, Chicago, Ill., assignor to Swift & Company, Chicago, Ill., a corporation of Illinois Application June 6, 1951, Serial No. 230,191

1 Claim. (Cl. 31—48)

The present invention relates to a device for cutting cheese curd or the like in the vat in which it is produced.

In the manufacture of cheese, the milk or cream is coagulated to produce a curd. The whey is drained from the curd and by further processing the cheese is produced from the curd. The usual practice is to cut the curd after the coagulation has taken place to facilitate the release of the whey therefrom.

The present invention has for its principal object the rapid severing of the curd within the vat in which it has been coagulated without the curd being subjected to any substantial displacement within said vat.

It has been recognized that it is desirable in cheese making operations to perform the cutting operations so that the resulting pieces of curd are of a uniform size. However, with conventional curd cutting devices the device often moves the curd within the vat with the result that uniform cutting is not achieved. Furthermore, such movement makes the task of the cheesemaker more difficult as more effort is required to pass the cheese harp, as the cutting instrument is called, through the entire mass of cheese. This displacement problem is much more acute with cylindrical vats than those of rectangular shape. By employing the instant method and apparatus, the displacement of the curd is substantially eliminated.

Further objects and advantages include: A device which is simple and which increases the manufacturing cost little if any above that for conventional devices, a device which is easily removed or properly positioned within vat, a device which is readily cleaned, and a method and apparatus which requires little effort to use and which is simply adapted for power-driven operation.

Figure 1:
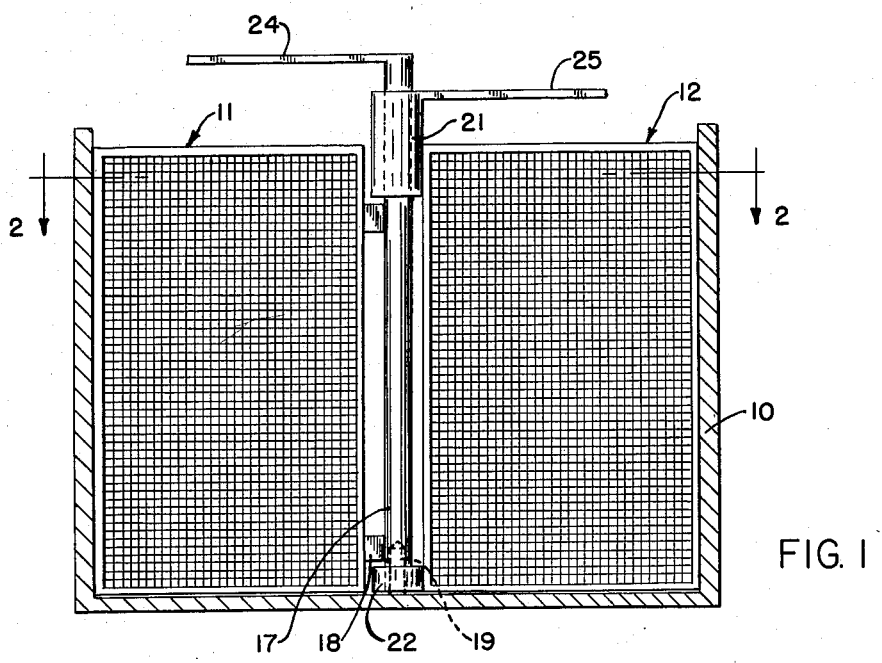
Figure 2:
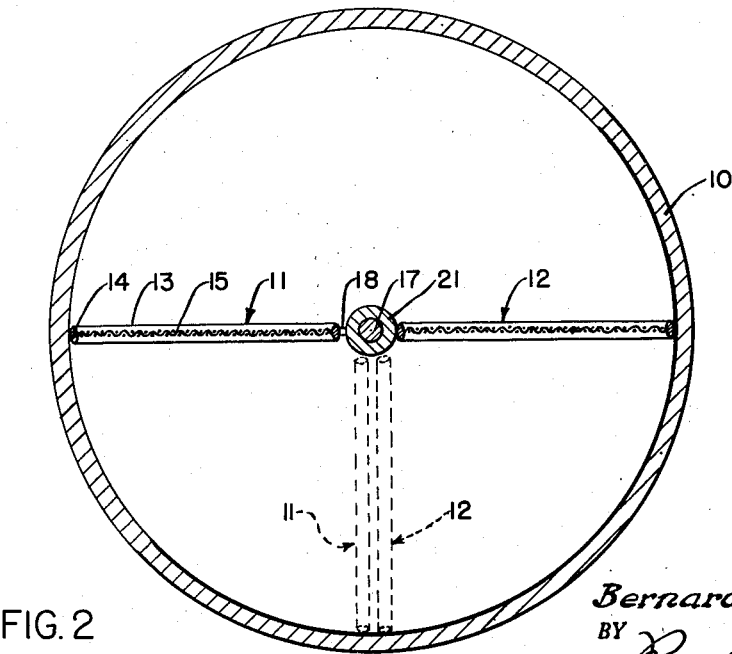

Additional objects and advantages will become apparent from the following description taken in conjunction with the drawings in which Fig. 1 is a sectional elevation of an embodiment of the present invention and Fig. 2 is a section taken at line 2—2 of Fig. 1.

The following description of a specific embodiment of the invention is for the purpose of complying with section 4888 of the revised statutes and should not be construed as imposing unnecessary limitations upon the appended claim.

The conventional practices in the manufacture of cheese are described in the book "Cheese" by Van Slyke & Price, the disclosure of which is incorporated herein by reference. Particular attention is directed to pages 164 et seq.

The milk or cream is coagulated in a suitable container such as the cylindrical tank 10. The present invention employs a pair of harps generally 11 and 12 to cut the curd formed by the coagulation process. Each harp comprises a rectangular frame 13 formed of a material having a substantially oval cross section as indicated at 14. As is seen in Fig. 1, the length of the top and bottom sides of frames 13 is slightly smaller than the radius of the vat. A plurality of intersecting wires 15 secured at either end to frame 13 form a grid dividing the space within frame 13 into a plurality of small openings, the size of which will depend upon the size of the pieces desired for the cut curd.

Frame 11 is secured to a vertical shaft 17 as by means of brackets 18. Shaft 17 has a vertical opening in one end thereof to fit about a centering pin 19 secured to the bottom of the tank 10.

Frame 12 is mounted on a sectional shaft formed by a pair of sleeves 21 and 22 attached to the top and bottom respectively of the frame. Each sleeve has a central opening to fit about shaft 17. The attachment of frame 11 to shaft 17 and the attachment of frame 12 to sleeves 21 and 22 is such that when positioned in the vat the tops and bottoms of the two frames will be substantially level.

Above the level of the tank, a pair of handles 24 and 25 are secured to shaft 17 and sleeve 21 respectively to enable the operator to turn the harps 11 and 12 about the tank and with respect to each other. It will be readily apparent that suitable power-driven apparatus could be easily substituted for the handles 24 and 25.

Preferably, the harps 11 and 12 are inserted into tank 10 prior to the time that the coagulation takes place in said tank. The harps are rotated so that they lie side by side as indicated in dotted lines in Fig. 2. After the coagulation has taken place and the curd is ready to cut, the operator grasps handles 24 and 25 and rotates the two harps 11 and 12 in opposite directions along a circular path until they again come together at the other side of tank 10. During this process, the wires 15 and the frame 14 cut through the curd to divide it into a plurality of long strips. In some embodiments, only one harp is rotated while the other is maintained in a fixed position.

It will be readily apparent that by employing the present method and apparatus, the curd is not moved about within the tank as it is cut. The pressure applied to the curd by one harp is resisted by the pressure of the other harp. If due to peculiar conditions within the curd one harp should apply more pressure to the curd than does the other, thus resulting in a movement of the curd in the container, all that happens is that the curd is pushed through the grid of the other harp and there is no deformation of the curd such as might occur should the curd be pressed against a more solid surface.

I claim:

Apparatus for cutting cheese curd or the like in a vat having a circular cross section, said apparatus including a pair of frames one side of which is approximately equal to the radius of the vat, a second, adjacent, side of said frames being positioned substantially along the axis of said circular cross section, a plurality of intersecting cutters secured to and positioned within each of said frames subdividing the area within the frames into a plurality of small openings, means secured to one of said frames mounting said frame for rotation about said axis to cause said cutters to slice the curd in said vat and tend to cause the curd to rotate in the vat ahead of said cutters, and means secured to the other of the frames whereby a force may be applied to said other frame to cause the cutters thereof to engage the curd and resist said tendency of the curd to rotate in the vat ahead of said one cutter.

BERNARD T. HENSGEN.

References Cited in the file of this patent

UNITED STATES PATENTS

| Number | Name | Date |
| --- | --- | --- |
| 107,423 | Swain | Sept. 13, 1870 |
| 306,700 | Russell | Oct. 14, 1884 |
| 541,173 | Maddox et al. | June 18, 1895 |
| 881,781 | Eastman | Mar. 10, 1908 |
| 1,546,756 | Schulze et al. | July 21, 1925 |
| 1,630,112 | Deagle | May 24, 1927 |
| 2,103,545 | Miollis | Dec. 28, 1937 |
| 2,193,462 | Miollis | Mar. 12, 1940 |
| 2,196,474 | Racklyeft | Apr. 9, 1940 |

FOREIGN PATENTS

| Number | Country | Date |
| --- | --- | --- |
| 1,631 | Great Britain | 1879 |